(12) United States Patent
Devos et al.

(10) Patent No.: US 7,719,480 B2
(45) Date of Patent: May 18, 2010

(54) DISPLAY WITH INTERLOCKABLE DISPLAY MODULES

(75) Inventors: John A. Devos, Corvallis, OR (US); P. Guy Howard, Junction City, OR (US); Richard E. Aufranc, Jr., Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1964 days.

(21) Appl. No.: 10/698,750

(22) Filed: Oct. 31, 2003

(65) Prior Publication Data

US 2005/0093768 A1    May 5, 2005

(51) Int. Cl.
*G09G 5/00* (2006.01)
(52) U.S. Cl. ...................................... 345/1.3
(58) Field of Classification Search .................. 345/1.3, 345/1.1, 1.2, 4, 9, 204; 455/550.1, 466; 348/51, 348/52, 53; 709/209, 210, 211; 349/73
See application file for complete search history.

(56) References Cited

U.S. PATENT DOCUMENTS

| | | | |
|---|---|---|---|
| 4,982,273 A | 1/1991 | Brody | |
| 5,523,769 A | 6/1996 | Lauer et al. | |
| 5,563,470 A | 10/1996 | Li | |
| 5,668,569 A | 9/1997 | Greene et al. | |
| 5,867,236 A | 2/1999 | Babuka et al. | |
| 6,252,564 B1 | 6/2001 | Albert et al. | |
| 6,418,267 B1 | 7/2002 | Lowry | |
| 6,515,723 B1 | 2/2003 | Suzuki | |
| 6,570,546 B1 | 5/2003 | Welker et al. | |
| 6,570,548 B2 | 5/2003 | Smith | |
| 6,636,181 B2 * | 10/2003 | Asano et al. | 343/702 |
| 6,791,513 B2 * | 9/2004 | Ogino et al. | 345/55 |
| 6,972,732 B1 * | 12/2005 | Nishikawa | 345/1.1 |
| 6,989,800 B2 * | 1/2006 | McLaughlin | 345/1.3 |
| 7,099,662 B2 * | 8/2006 | Fuenfgeld et al. | 455/423 |
| 7,197,329 B2 * | 3/2007 | Ezumi | 455/550.1 |
| 2002/0122134 A1 | 9/2002 | Kalua | |
| 2002/0140629 A1 | 10/2002 | Sundahl | |
| 2002/0163597 A1 | 11/2002 | Kelleher et al. | |
| 2003/0011724 A1 | 1/2003 | Sundahl | |
| 2003/0016227 A1 | 1/2003 | Matthies | |
| 2003/0160755 A1 | 8/2003 | Gettemy et al. | |

* cited by examiner

*Primary Examiner*—Abbas I Abdulselam (57) ABSTRACT

A display of an embodiment of the invention includes a number of display modules that are interlockable to form the display. Each display module includes at least one user-viewable display element, at least one connector, and at least one receptor, which are disposed in the display module. Each of a number of pixels of the display corresponds to at least one of the display elements of each display module. The connectors of each display module at least receive power from and/or provide power to adjacent display modules. The receptors of each display module are receptive to connectors of other adjacent display modules.

27 Claims, 4 Drawing Sheets

DISPLAY WITH INTERLOCKABLE DISPLAY MODULES

BACKGROUND

Using display devices within computerized systems has almost become a foregone conclusion. Where output of information to a user is desired, most computerized devices either have integrated display devices on which to display this information, or expect that external display devices be connected to them to display information. Different types of display technologies include cathode-ray tube (CRT), light-emitting diode (LED), liquid-crystal display (LCD), liquid crystal on silicon (LCOS), organic LED (OLED), and rear and front projection, among many others.

Sometimes situations call for information to be displayed on a very large scale. In conference rooms, outside information displays viewable from hundreds of feet away, exhibition halls, and other locations, being able to display information so that a large number of people from various distances away can see the information can be important. Usually two different approaches are used in such situations.

First, a large display device may be employed. A large plasma display, for instance, may be used in a conference room or an exhibition hall, or a very large weatherproof LED or LCD display may be used in outside areas. However, large display devices can be difficult to transport. Large plasma displays, for instance, may weigh over one hundred pounds. Large LED or LCD displays, that are a half-story or larger in height, may need the utilization of a crane or other machinery to be put into place.

Second, a number of smaller stand-alone display devices, intended for individual use as perhaps the exclusive displays within computerized systems, may be positioned relative to one another in a given configuration so that from a reasonable distance away they appear to be a single display device. However, each individual usually has its own power cable and communication cable. For a large display made up of a great number of individual display devices, having to coordinate all these different cables can be a chore. Moreover, many computerized systems may not be equipped to handle a large number of individual display devices to make up a large display.

For these and other reasons, there is a need for the present invention.

SUMMARY OF THE INVENTION

A display of an embodiment of the invention includes a number of display modules that are interlockable to form the display. Each display module includes at least one user-viewable display element, at least one connector, and at least one receptor, which are disposed in the display module. Each of a number of pixels of the display corresponds to at least one of the display elements of each display module. The connectors of each display module at least receive power from and/or provide power to adjacent display modules. The receptors of each display module are receptive to connectors of other adjacent display modules.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Multiple-Display Module Display and System Including Such Display

Figure 1:
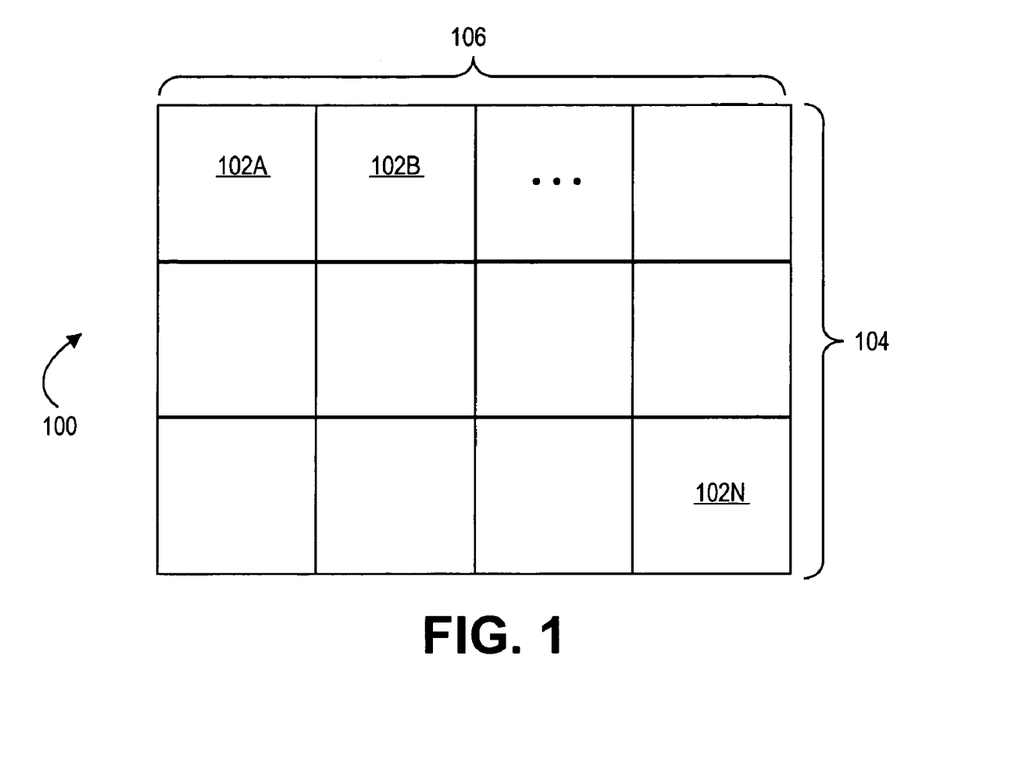
FIG. 1 is a diagram of a display made up of a number of interlocking display modules, according to an embodiment of the invention.

FIG. 1 shows a multiple-display module display 100 having a number of interlocking display modules 102A, 102B, . . . , 102N, according to an embodiment of the invention. As depicted in FIG. 1, the display modules 102 are organized within a number of rows 104 and a number of columns 106. Where each of the display modules 102 is rectangular and has a 4:3 width-to-height ratio, having four of the columns 106 and three of the rows 104 means that the display 100 effectively functions as a larger display also having a 4:3 width-to-height ratio. Each of the display modules 102 can display an appropriate portion of the information to be displayed on the display 100, based on the configuration of the display module relative to the other modules. For instance, in the example of FIG. 1, where there are twelve of the modules 102, each of the modules 102 displays a different appropriate one-twelfth portion of the information displayed on the display 100.

As used herein, the term configuration connotates the position of each of the display modules 102 within the display 100, relative to the other of the modules 102. For example, the configuration of the display module 102A relative to the other display modules 102 is that it is the upper-left-most module of the display modules 102 within the display 100. As another example, the configuration of the display module 102N is that it is the lower-right-most module of the modules 102 within the display 100. Thus, the display module 102A displays a portion of the information displayed on the display 100 that corresponds to the upper-left-most one-twelfth of this display information, whereas the module 102N displays a portion of the information that corresponds to the lower-right-most one-twelfth of this information. That is, it is said that each of the modules 102 displays a portion of the display information to be displayed on the display 100 that is appropriate, as based on its configuration relative to the other modules 102.

The phrase display information is used herein in an encompassing sense, and denotes the information that the display modules 102 of the display 100 are to display, whether or not a given display module is to actively turn on. For instance, the display information to be displayed by one of the display modules 102 may be a "dark" pixel or pixels, in that this display module does not actually turn on to cause the pixel to be on, but rather maintains its off state so that no pixel is shown. That is, the phrase display information is indicative of a given display module actively turning on to cause one or more pixels to be on, or turning off, or staying turned off, to cause one or more pixels to be or remain off, and dark.

Figure 2A:
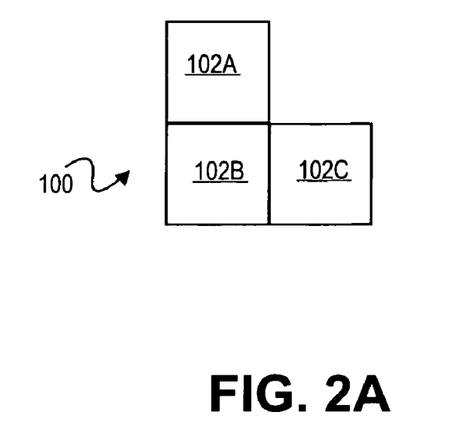
FIGS. 2A and 2B are each a diagram of a display made up of a number of interlocking display modules, according to other embodiments of the invention.
Figure 2B:
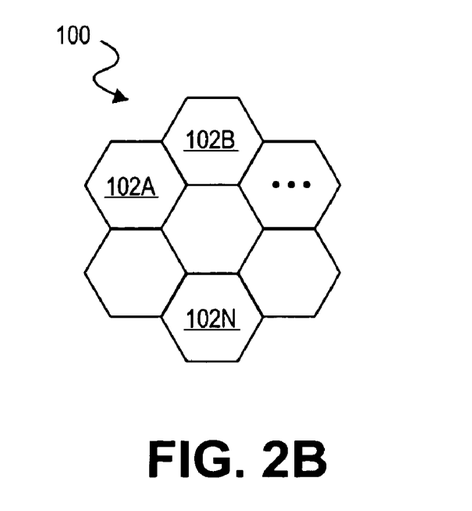

Whereas the display modules 102 are depicted in FIG. 1 as being rectangular in shape and being configured to yield the display 100 also being proportionately rectangular in shape, in other embodiments of the invention the display modules 102 may have other shapes, and/or may be configured such that the display 100 has a different shape. For instance, in the embodiment of FIG. 2A, the display 100 is made up of three display modules 102A, 102B, and 102C that are rectangular in shape. However, the display 100 is itself L-shaped, since the module 102A is positioned above the module 102B, and the module 102C is positioned to the right of the module 102B. As another example, in the embodiment of FIG. 2B, the display 100 is made up of the display modules 102A, 102B, . . . , 102N that are hexagonal in shape. Furthermore, each of the modules 102 that make up the display 100 do not have to be the same size as the other of the modules 102.

The sizing of the display modules 102 may vary depending on the application within which the display 100 is used. For instance, to make a large display as the display 100, each of the modules 102 may have a size comparable to that of a standard, stand-alone display typically intended as the exclusive display within a single-user system. That is, the modules 102 may have diagonal measurements of, for instance, fifteen inches, seventeen inches, twenty-one inches, and so on. Each of the modules 102 may also be relatively large in size, such that the display 100 is even larger. For example, the modules 102 may have diagonal measurements of, for instance, forty-two or fifty inches.

At the other end of the sizing spectrum, each of the display modules 102 may be relatively small in size, such that the resulting display 100 is itself the size of a standard, stand-alone display typically used as the exclusive display within a single-user system. For example, each of the modules 102 may have diagonal measurements of a few inches or less, such that the display 100 may have a diagonal measurement of, for instance, fifteen inches, seventeen inches, and so on. That is, the modularity afforded by the display modules 102 making up the display 100 does not control the size of either the individual sizes of the modules 102 or the resulting size of the display 100.

Thus, the display modules 102 can be microscope in size in one embodiment in one embodiment of the invention and larger, such as hand-held size, and so on, in another embodiment. Different of the display modules 102 that make up the same display 100 may have different sizes and shapes. The resulting display 100 may itself have a physical shape that is microscopic or larger as well, from a very small display, to a display intended to be used as a single-user display, to a display that is meant to be viewed by many users within a conference room or exhibition hall, to a display that is meant to be used outdoors and viewable at far distances, and so on. The display 100 may have a shape that is independent of the shapes of the display modules 102. For example, the display modules 102 may be rectangular or octagonal, whereas the resulting display 100 may be hexagonal or substantially circular. Furthermore, the display modules 102 themselves may each correspond to a single pixel, or more than one pixel, of the resulting display 100.

Furthermore, the display 100 may be one-dimensional, two-dimensional, or three-dimensional. For instance, where the display 100 is one dimensional, it may be a linear display having one line of pixels. Where the display 100 is two dimensional, it may have more than one row of pixels and more than one column of pixels within a rectangular form factor, or may have a form factor that is not rectangular. Where the display is three dimensional, it may be holographic in nature, allowing three-dimensional objects to be displayed.

The display modules 102 may be at least partially self-powered, such as partially solar-powered or battery powered. When a given of the display modules 102 does not have to turn on, it may not need all the power that it self-provides, and therefore can share its power to other of the display modules 102 that are turning on and need more power than they can self-generate. Thus, when a given of the display modules 102 has to turn on and needs more power than can be generated itself, the display module may receive additional power from other of the display modules 102.

Figure 3:
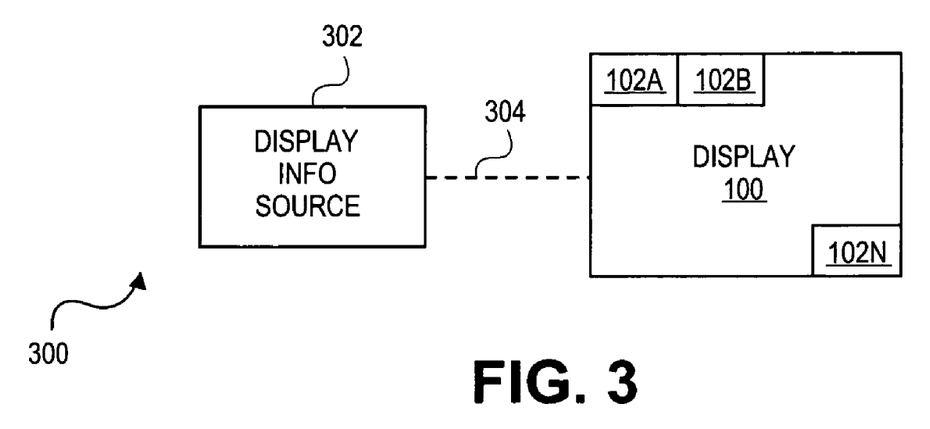
FIG. 3 is a block diagram of a rudimentary system including a multiple-display module display and a display information source, according to an embodiment of the invention.

FIG. 3 shows a rudimentary system 300 in which the display 100 can be employed, according to an embodiment of the invention. The system 300 includes a display information source 302 communicatively coupled to the display 100, as represented by the dotted line 304. For illustrative clarity, just three display modules 102A, 102B, and 102N of the display modules 102 of the display 100 are specifically called out. The display information source 302 may be a computerized device, such as a desktop or laptop computer, a video component capable of outputting display information, such as a video-cassette recorder (VCR) or a digital-video disc (DVD) player, or the display information source 302 may be another type of display information source.

The dotted line 304 representing the communicative coupling of the display information source 302 and the display 100 indicates that the communicative coupling may be wired or wireless. For example, the communicative coupling may be a standard wired connection between the source 302 and the display 100, such as one that employs video-graphics array (VGA) fifteen-pin connectors, one that employs digital video interface (DVI) connectors, and so on. The communicative coupling may be wireless in that the source 302 may convey display information to the display 100 via radio frequency (RF) waves, infrared (IR) signals, or in another wireless manner. In this embodiment, the connectors and receptors are employed just for power purposes.

In one embodiment, the display information source 302 conveys the display information that is to be displayed on the display 100 as a whole to a designated, master display module of the display modules 102 of the display 100. As an example, the display module 102A may be considered the master display module, such that the other of the display modules 102 are slave display modules. The display module 102A then may determine which of the display modules 102 are to display which parts of the display information, and appropriately convey these portions of the display information to the other display modules 102. Alternatively, the display module 102A may convey the display information as received from the source 302 to all the other modules 102, and each of the modules 102 determines for itself which portion of the display information it is to display.

In another embodiment, the display information source 302 conveys the information that is to be displayed on the display 100 as a whole to all of the display modules 102 at the same time. For instance, the source 302 may use a wireless transmitter, such as an IR or RF transmitter, to convey the display information to all of the display modules 102. Each of the display modules 102 then determines which portion of the display information it is specifically to display. Alternatively, the display information source 302 may determine which portion of the display information is to be displayed by each of the modules 102, and correspondingly communicate directly to each of the modules 102 the portion of the display information to be displayed by each of the modules 102.

In other words, the display 100 may have a master-slave approach to displaying display information, or a distributed approach. In the master-slave approach to displaying information, either one of the display modules 102 of the display 100, serving as the master display module, determines which information is to be displayed by each of the modules 102, or the display information source 302 itself determines which information is to be displayed by each of the modules 102. In the distributed approach, the display information is conveyed, or distributed, to all of the modules 102, either directly from the source 302 or from one of the modules 102 serving as the master display module, and each of the modules 102 determines for itself which information it is to display.

Similarly, configuration of the display modules 102 such that each module knows its position relative to the other display modules 102 of the display 100, as well as the configuration of all the display modules 102 making up the display 100, and thus the size and shape of the resulting display 100, may be determined in accordance with an automatic distributed approach or a manual or automatic master-slave approach. In an automatic distributed approach, each of the display modules 102 may query the other of the display modules 102 to learn where it has been positioned relative to the other of the modules 102. For instance, each of the modules 102 may learn its one or more immediately adjacent neighbor modules. Once all of the modules 102 have learned with which of the other of the modules 102 they are directly interlocked, each of the modules 102 is able to deduce where it is in relation to all of the other modules 102. As a result, each of the display modules 102 is able to determine which portion of the display information it is to display, as well as the entire size and shape of the display 100.

In a manual master-slave approach, the user setting up the display 100 may indicate, via a switch on each of the display modules 102, or by sending a signal from, for instance, the display information source 302, to each of the display modules 102, the position of each of the display modules 102 relative to the other of the modules 102, as well as the size and shape of the display 100 as a whole. In an automatic master-slave approach, one of the display modules 102 serving as the master display module, or the source 302, may determine the configuration of each of the modules 102 relative to the other of the modules 102, then indicate to each of the display modules 102 its position relative to the other of the modules 102. Thus, in either master-slave approach, the modules 102 are told their configuration or position within the display 100, such that they then know which portion of the display information to display thereon.

The display modules 102 within the display 100 may also be hot pluggable and reconfigurable in real-time. First, this means that the display modules 102 may be disconnected from and connected to other of the display modules 102 while power is being provided to the display modules 102. For instance, if one of the display modules 102 is faulty, it may simply be removed and replaced with a new display module. Second, this means that the display modules 102, after one or more of them have been removed, or after one or more new modules have been added, may be able to reconfigure themselves in real-time. For instance, if two of the modules 102 are removed, the remaining of the modules 102 may be able to automatically configure themselves such that their new configurations and positions relative to one another are determined. As another example, if three more display modules are added, the new set of the display modules 102 may also be able to automatically configure themselves such that their new configuration and positions relative to one another are determined.

Display Module For Multiple-Display Module Display

Figure 4:
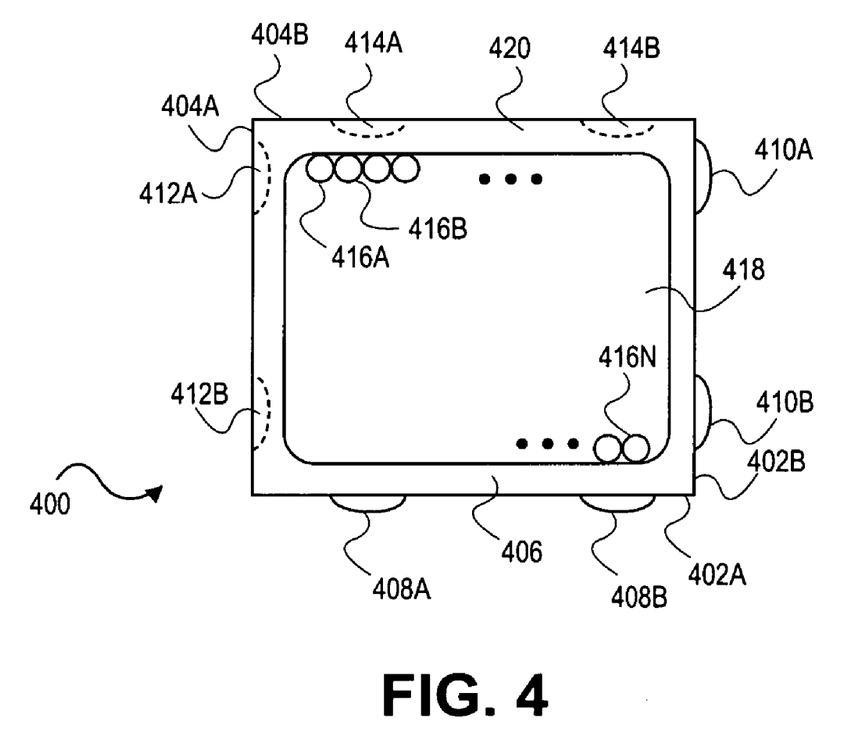
FIG. 4 is a diagram of an example display module that can be used as one or more of the display modules of a multiple-display module display, according to an embodiment of the invention.

FIG. 4 shows an example display module 400 for the multiple-display module display 100, according to an embodiment of the invention. An instance of the display module 400 may serve as each of the display modules 102 of the display 100, for example. The display module 400 has sides 402A and 402B, collectively referred to as the sides 402, sides 404A and 404B, collectively referred to as the sides 404, and a front 406. A number of display elements 416A, 416B, . . . , 416N, collectively referred to as the display elements 416, make up a display area 418 situated within a housing 420 of the display module 400, and are viewable from the front 406 of the display module 400.

The display elements 416 can use any type of display technology, such as cathode-ray tube (CRT), light-emitting diode (LED), liquid-crystal display (LCD), liquid crystal on silicon (LCOS), organic LED (OLED), and rear and front projection, among many others. Where the display 100 has a number of pixels corresponding to a given resolution of the display 100, each of these pixels correspond to one or more of the display elements 416. For instance, each of the display elements 416 can simply correspond to one of the pixels of the display 100, or to four or more of the pixels of the display 100, and so on. As another example, all of the display elements 416 of the display module 400 may correspond to a single pixel of the display 100. Furthermore, there may be just one of the display elements 416 within the display module 400, corresponding to a single pixel of the display 100. It is noted that previously in the detailed description where it is stated that a display module displays display information, in actuality the display elements of the module are displaying this information.

There are connectors 408A and 408B, collectively referred to as the connectors 408, mounted on the side 402A of the housing 420 of the display module 400, and connectors 410A and 410B, collectively referred to as the connectors 410, mounted on the side 402B of the housing 420 of the module 400. The connectors 408 and 410 are at least power connectors. That is, the connectors 408 and 410 at least receive power from display modules adjacent to the display module 400, and send power to other display modules adjacent to the display module 400. In addition, in one embodiment, the display information communicated among the display modules of the display 100 is superimposed onto the power signals conveyed over the connectors 408 and 410, such that the connectors 408 and 410 also send signals conveying this display information. Whereas in FIG. 4 there are two of the connectors 408 and two of the connectors 410, in other embodiments of the invention there may be more or less of each of the connectors 408 and 410.

There are receptors 412A and 412B, collectively referred to as the receptors 412, mounted on or within the side 404A of the housing 420 of the display module 400, and receptors 414A and 414B, collectively referred to as the receptors 412, mounted on or within the side 404B of the housing 420 of the module 400. The receptors 412 and 414 are receptive to the connectors of adjacent display modules to the display module 400. For instance, the connectors 410 of a display module to the left of the module 400 can plug into the receptors 412 of the module 400, whereas the connectors 408 of a display module above the module 400 can plug into the receptors 414 of the module 400. Whereas in FIG. 4 there are two of the receptors 412 and two of the receptors 414, in other embodiments of the invention there may be more or less of each of the receptors 412 and 414.

Thus, for the display modules of the display 100 to receive power, it is necessary only for one of the display modules to actually be connected to a power source, such as a wall outlet, a battery, or event the source 302. This display module then is able to convey the power received from the power source to the other display modules via the connectors 408 and 410 and the receptors 412 and 414 of all the modules. Such a power distribution scheme eases connection of the display modules to the power source. That is, the display 100 is connected to the power source as if it were not a modular display, when in fact the display 100 is made up of a number of modular display modules, even though only one of the display modules is actually connected to the power source.

The connectors 408 and 410 and the receptors 412 and 414 of the display module 400 also may enable the display module 400 to interlock with other display modules to make up the display 100. That is, the connectors 408 and 410 and the receptors 412 and 414 of the various display modules, besides distributing power among the modules and optionally display information among the modules, also act as the interlocking mechanisms that lock the display modules together to form the display 100. The connectors 408 and 410 of one module thus may snapably interlock into the receptors 412 and 414 of other display modules, and so on. Alternatively, there may be interlocking mechanisms in addition to and/or in lieu of the connectors 408 and 410 and the receptors 412 and 414 that primarily distribute power among the display modules.

Figure 5:
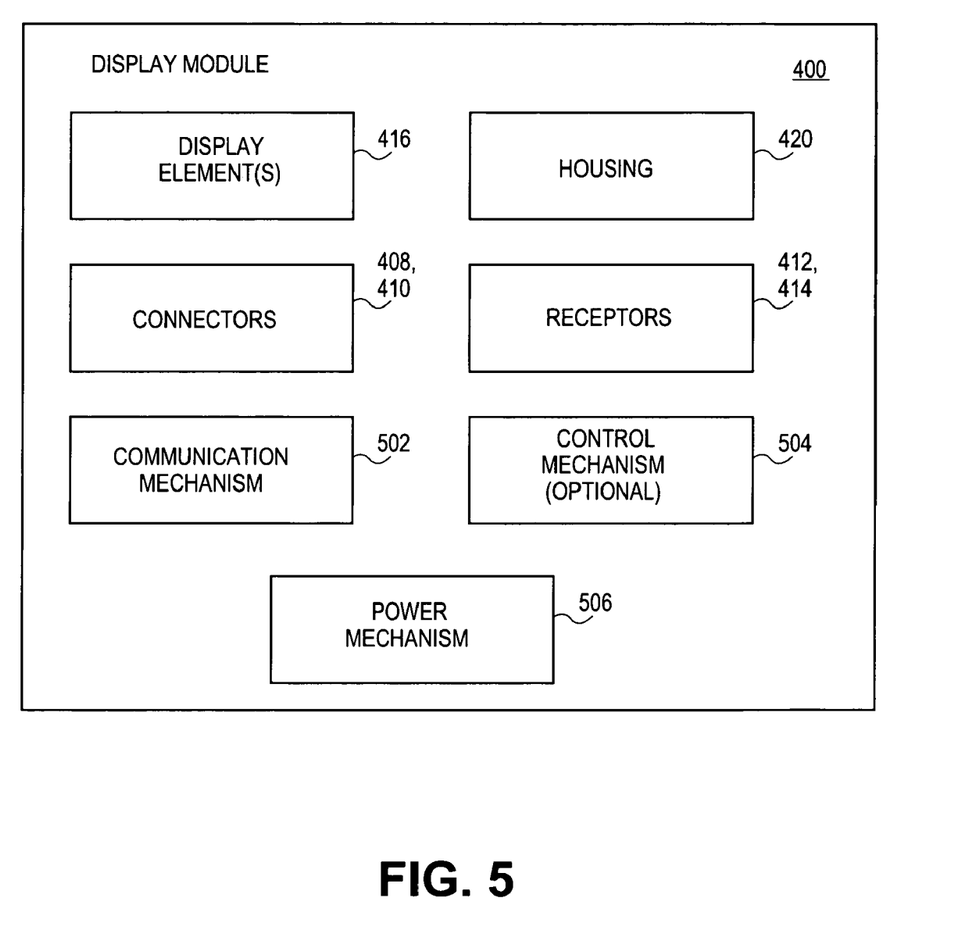
FIG. 5 is a block diagram of the display module of FIG. 4, according to an embodiment of the invention.

FIG. 5 shows a block diagram of the display module 400, according to an embodiment of the invention. The display module 400 is depicted in FIG. 5 as including the display element(s) 416, the housing 420, the connectors 408 and 410, the receptors 412 and 414, a communication mechanism 502, and optionally a control mechanism 504 and/or a power mechanism 506. As can be appreciated by those of ordinary skill within the art, the display module 400 may include components in addition to and/or in lieu of those depicted in FIG. 5. Each of the mechanisms 502, 504, and 506 includes the components needed to perform their respective functionalities, as will be described, and may be implemented in hardware, software, or a combination of hardware and software.

The communication mechanism 502 allows the display module 400 to communicate with other display modules of the display 100, as has been described. For example, the communication mechanism 502 may enable the display module 400 to receive and/or send display information relative to the other displays of the display 100. The communication mechanism 502 may be a radio frequency (RF) receiver and/or transmitter, an infrared (IR) or other type of optical receiver and/or transmitter, an encoder and decoder to encode display information on power signals and decode information from power signals, or another type of communication mechanism.

For instance, where the communication mechanism 502 is a wireless transmitter and/or receiver, such as an RF or an IR transmitter and/or receiver, the mechanism 502 enables the display module 400 to receive display information. As an example, one of the display modules of the display 100 may be communicatively coupled to the display information source 302 via a wired connection, and have a wireless transmitter to convey the display information received from the source 302 as appropriate to the other display modules. These other display modules would then have wireless receivers in order to receive the display information as appropriate from the display module connected to the source 302.

As another example, a wireless receiver may be present in each of the display modules of the display 100, or just one of the display modules of the display 100, where a corresponding wireless transmitter is part of the display information source 302, as either internal or external to the source 302. In the former case, each display module wirelessly receives the display information from the source 302. In the latter case, the display module having the wireless receiver receives the display information from the source 302, and then may convey the display information to the other display modules by superimposing the information on the power signals distributed throughout the modules.

The control mechanism 504 is optionally present in at least one of the display modules of the display 100 so that the display module is able to determine the configuration of at least itself relative to the other display modules of the display 100. For example, where each of the display modules includes the control mechanism 504, in which case the control mechanism 504 automatically self-determines the configuration of its display module relative to the other display modules, as has been described. As another example, where one of the display modules includes the control mechanism 504, then this display module may be responsible for determining the configuration of all the display modules relative to one another, as has also been described.

The power mechanism 506 allows the display module 400 to be partially self powered. The power mechanism 506 may be a solar power mechanism, a battery mechanism, or another type of power mechanism. The power mechanism 506 allows the display module 400 to contribute power for use by other display modules of the display 100 via the connectors 408 and 410 and the receptors 412 and 414, when the display module 400 is not actively displaying a pixel. When the display module 400 is active displaying a pixel, it may then receive power from other display modules via the same connectors 408 and 410 and receptors 412 and 414.

Methods

Figure 6:
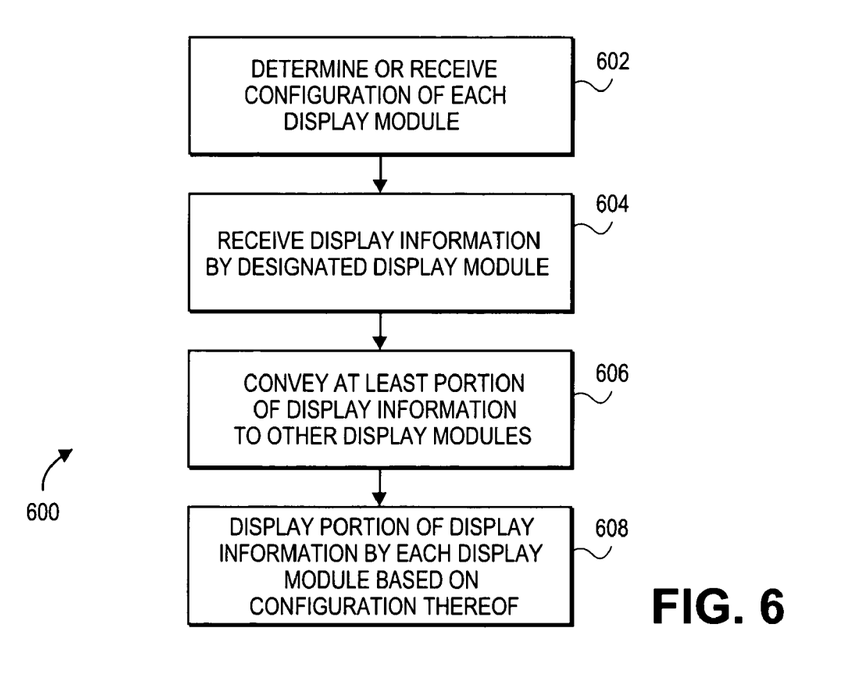
FIG. 6 is a method for using a multiple-display module display, according to an embodiment of the invention.

FIG. 6 shows one method 600 for using the display 100 having the display modules 102, according to an embodiment of the invention. As can be appreciate by those of ordinary skill within the art, there can be other approaches for using the display 100 having the display modules 102. First, the configuration of each of the modules 102 relative to the other of the modules 102 is either determined or received (602). For instance, a designated one of the display modules 102 may determine the configuration of all of the modules 102, or receive from each of the other display modules 102 or from the source 302 or via the user the configuration of the modules 102.

Display information is then received by the designated display module from the display information source 302 (604). The designated display module conveys at least a portion of this display information to the other display modules (606), which then display a portion of the display information as appropriate, based on their configuration relative to the other display modules (608). For example, the designated display module may convey all the information to the other display modules, such that each display module is itself responsible for determine which portion to actually display. Alternatively, the designated module may determine the portion of the display information to be displayed by each module, and convey to each module the portion it is to display.

Figure 7:
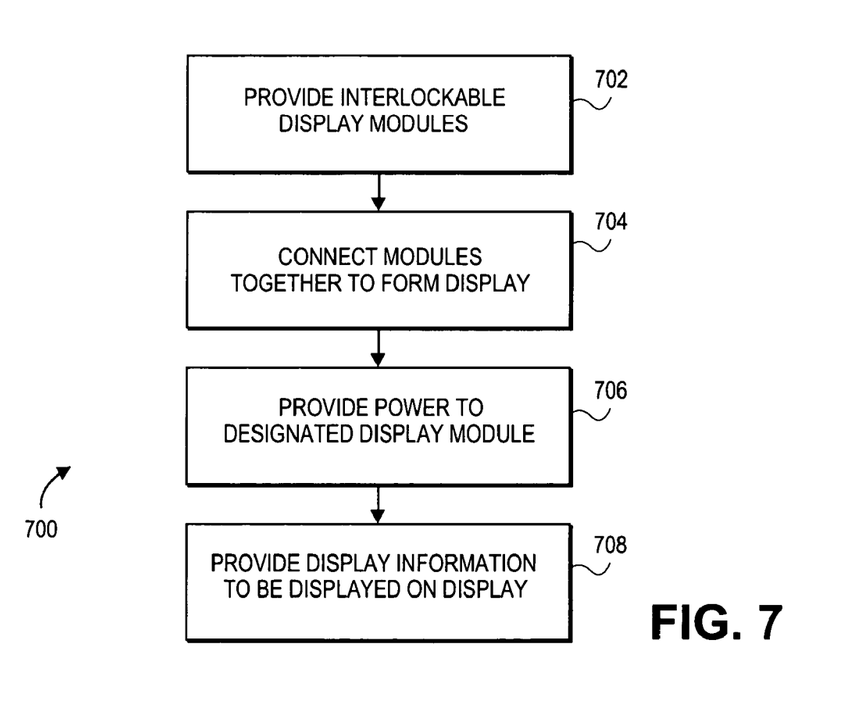
FIG. 7 is a method for assembling a display from a number of display modules, according to an embodiment of the invention.

FIG. 7 shows one method 700 for assembling the display modules 102 into the display 100, according to an embodiment of the invention. First, a number of interlockable display modules 102 are provided (702), such as a number of instances of the display module 400 that has been described. The display modules 102 are connected together to form the display 100 (704), having a particular configuration as to each of the modules 102 relative to each other of the display modules 102. Power is then provided to a designated one of the display modules 102 (706), where the interlocking nature of the modules 102 enables the power to be distributed among all the modules 102. Finally, display information is provided to the display 100 (708), such that each of the display modules 102 displays a portion of the information in accordance with its configuration.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

We claim:

1. A display comprising: a plurality of display modules interlockable to form the display, each display module comprising: at least one user-viewable display element disposed in the display module, each of a plurality of pixels of the display corresponding to at least one of the display elements; at least one connector disposed in the display module to at least one of receive power from and provide power to a first adjacent display module; and, at least one receptor disposed in the display module and receptive to a connector of a second adjacent display module, wherein one of the plurality of display modules is a master display module and other of the plurality of display modules are slave display modules, the master display module communicating display information to each of the slave display modules that the at least one display element of the slave display module is to display, and wherein the master display module determines a configuration of each slave display module relative to other of the plurality of display modules, to determine the display information to be communicated to the slave display module that the at least one display element of the slave display module is to display.

2. The display of claim 1, wherein each display module of the plurality of display modules is at least partially self-powered, such that remaining power needed by the display module is received from other of the plurality of display modules.

3. The display of claim 2, wherein each display module is solar powered.

4. The display of claim 2, wherein each display module is battery powered.

5. The display of claim 1, wherein at least one of the plurality of display modules is hot pluggable, such that the at least one display module is disconnectable from and connectable to other of the plurality of display modules while power is being provided to the plurality of display displays.

6. The display of claim 1, wherein each display module is rectangular in shape.

7. The display of claim 1, wherein the display is three-dimensional.

8. The display of claim 1, wherein the display has a shape that is independent of a shape of each display module.

9. A display comprising: a plurality of display modules interlockable to form the display, each display module comprising: at least one user-viewable display element disposed in the display module, each of a plurality of pixels of the display corresponding to at least one of the display elements; at least one connector disposed in the display module to at least one of receive power from and provide power to a first adjacent display module; at least one receptor disposed in the display module and receptive to a connector of a second adjacent display module; and, a power mechanism to partially self-power the display module, such that remaining power needed by the display module is received from other of the plurality of display modules, wherein one of the plurality of display modules is a master display module and other of the plurality of display modules are slave display modules, the master display module communicating display information to each of the slave display modules that the at least one display element of the slave display module is to display, and wherein the master display module determines a configuration of each slave display module relative to other of the plurality of display modules, to determine the display information to be communicated to the slave display module that the at least one display element of the slave display module is to display.

10. The display of claim 9, wherein the power mechanism of each display module is a solar power mechanism.

11. The display of claim 9, wherein the power mechanism of each display module is a battery mechanism.

12. A display comprising: a plurality of display modules interlockable to form the display, each display module having a front, at least one first side, and at least one second side, and comprising: at least one display element viewable from the front of the display module, each of a plurality of pixels of the display corresponding to at least one of the display elements; at least two connectors mounted on the first sides of the display module to at least one of receive power from and provide power to first adjacent display modules; and, at least two receptors mounted on the second sides of the display module and receptive to connectors of second adjacent display modules, wherein one of the plurality of display modules is a master display module and other of the plurality of display modules are slave display modules, the master display module communicating display information to each of the slave display modules that the at least one display element of the slave display module is to display, wherein the master display module determines a configuration of each slave display module relative to other of the plurality of display modules, to determine the display information to be communicated to the slave display module that the at least one display element of the slave display module is to display.

13. The display of claim 12, wherein display information conveying information to be displayed by the at least one display element of each display module is superimposed over power signals communicated among the plurality of display modules via the at least two connectors of each display module.

14. The display of claim 12, wherein each display module further comprises a radio frequency (RF) transmitter and/or receiver to send and/or receive display information to be displayed by the at least one display element of the display module.

15. The display of claim 12, wherein each display module further comprises an optical transmitter and/or receiver to send and/or receive display information to be displayed by the at least one display element of the display module.

16. The display of claim 12, wherein at least one of the plurality of display modules is hot pluggable, such that the at least one display module is disconnectable from and connectable to other of the plurality of display modules while power is being provided to the plurality of display displays.

17. A display module for a multiple-display module display comprising:
a housing having a front, at least two first sides, and at least two second sides; at least one display element viewable from the front of the housing, each of a plurality of pixels of the display corresponding to at least one of the display elements; at least two connectors mounted on the first sides of the display module to at least receive power from and send power to first adjacent display modules of the display, the display module interlockable with the first adjacent display modules; at least two receptors mounted on the second sides of the display module and receptive to connectors of second adjacent display modules of the display, the display module interlockable with the second adjacent display modules; and, a communication mechanism to at least one of receive display information and send display information, wherein the display module is a master display module to communicate the display information to each of other display modules of the multiple-display module display to be displayed by the other display modules, the other display modules being slave display modules, and wherein the master display module determines a configuration of each slave display module to the other of the plurality of display modules, to determine the display information to be communicated to the slave display module that the at least one display element of the salve display module is to display.

18. The display module of claim 17, wherein the display information is superimposed over power signals on the at least two connectors.

19. The display module of claim 17, further comprising at least two additional connectors mounted on one of the first sides and the second sides of the display module to at least receive display information to be displayed by the at least one display element.

20. The display module of claim 17, wherein the communication mechanism is one of:
a radio frequency (RF) receiver, and an optical receiver.

21. The display module of claim 17, further comprising a control mechanism to at least automatically self-determine a configuration of the display module relative to other display modules of the multiple-display module display.

22. The display module of claim 17, wherein the housing is rectangular in shape.

23. A system comprising: a display information source to generate display information; and, a plurality of modular, interlocking means for displaying the display information, wherein the display information is distributed among the means and power is distributed among the plurality of modular, interlocking means, wherein one of the plurality of modular, interlocking means is a master means and other of the plurality of modular, interlocking means are slave means, the master means communicating display information to each of the slave means that the display means is to display, and wherein the master means determines a configuration of each slave means relative to other of the plurality of display modules, to determine the display information to be communicated to the slave means that the at least one display element of the means is to display.

24. A method comprising: receiving display information from a display information source by a designated master display module of a plurality of interlockable display modules of a display; conveying a portion the display information to each of other of the plurality of display modules by the designated master display module, the other of the plurality of display modules being slave display modules; displaying the portion of the display information by of display modules; distributing power among the plurality of interlockable display modules of the display, wherein conveying the display information to each of the other of the plurality of display modules by the designated display module comprises determining by the designated display module the portion of the display information to be displayed by each of the other of the plurality of display modules, the other of the plurality of display modules being salve display modules, and wherein the master display module determines a configuration of each display module relative to the other of the plurality of display modules, to determine the display information to be communicated to the slave display module that the at least one display element of the slave display module is to display.

25. A method: providing a plurality of interlockable display modules, each having at least two connectors mounted on sides thereof to at least receive power from and provide power to adjacent display modules, and at least two receptors mounted on sides thereof that are receptive to connectors of the adjacent display modules; and, connecting the plurality of interlockable display modules together to form a display having a configuration, wherein one of the plurality of display modules is a master display module and other of the plurality of display modules are slave display modules, the master display module to communicate display information to each slave display module that each slave display module is to display, and wherein the master display module determines a configuration of each slave display module relative to other of the plurality of display modules, to determine the display information to be communicated to the slave display module that the at least one display element of the slave display module is to display.

26. The method of claim 25, further comprising providing power to a designated one of the plurality of display modules, such that other of the plurality of display modules receive and provide power over the connectors thereof.

27. The method of claim 25, further comprising providing display information to be displayed by the display, each display module displaying a portion of the display information.

* * * * *

UNITED STATES PATENT AND TRADEMARK OFFICE
CERTIFICATE OF CORRECTION

PATENT NO. : 7,719,480 B2  
APPLICATION NO. : 10/698750  
DATED : May 18, 2010  
INVENTOR(S) : John A. Devos et al.

It is certified that error appears in the above-identified patent and that said Letters Patent is hereby corrected as shown below:

In column 11, line 41, in Claim 17, delete "salve" and insert -- slave --, therefor.

In column 12, line 21, in Claim 24, delete "by of display modules;"
and insert -- by each of the other of the plurality of display modules as received by each of the other of the plurality of display modules; and, --, therefor.

In column 12, line 29, in Claim 24, delete "salve" and insert -- slave --, therefor.

Signed and Sealed this

Thirty-first Day of August, 2010

David J. Kappos
*Director of the United States Patent and Trademark Office*